Aug. 18, 1964     J. A. BALDWIN ETAL     3,145,169
OIL FILTER CARTRIDGES
Filed Jan. 5, 1962
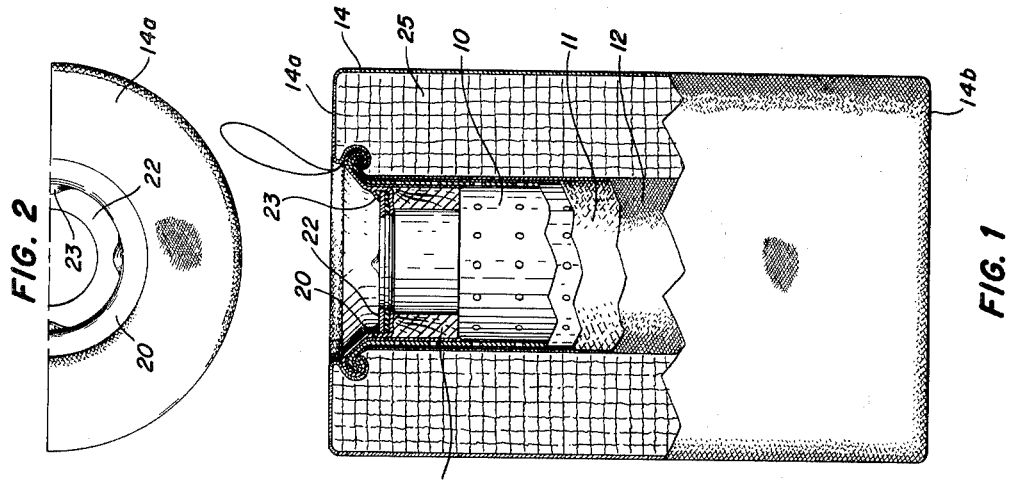
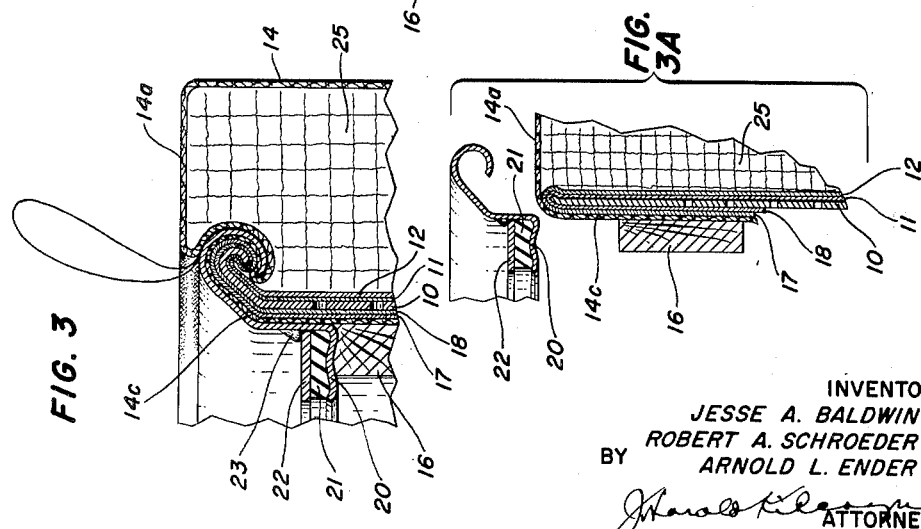
INVENTORS
JESSE A. BALDWIN
ROBERT A. SCHROEDER and
BY    ARNOLD L. ENDER
ATTORNEY

United States Patent Office 3,145,169
Patented Aug. 18, 1964

3,145,169
OIL FILTER CARTRIDGES
Jesse A. Baldwin, Robert A. Schroeder, and Arnold L. Ender, Kearney, Nebr., assignors to J. A. Baldwin Manufacturing Company, Kearney, Nebr., a corporation of Wisconsin
Filed Jan. 5, 1962, Ser. No. 164,448
4 Claims. (Cl. 210—232)

This invention relates to improvements in oil filters and in the manufacture thereof, and more particularly to an improved filter element or cartridge adapted to and designed for filtering the oil of the lubrication systems of internal combustion engines, both gas and Diesel, such as are employed to power present-day automobiles, trucks, tractors and the like.

As explained in our application Serial No. 164,449, filed under even date, there recently has been developed a low-cost filtering media capable not only of rendering lubricating oils and other liquids both chemically and visibly clean, but also one which is so constituted and can be prepared in such a way as to make possible the production of filter elements therefrom in modern, high-speed automatic or semi-automatic filter-element packing equipment. Speaking generally, this new filtering media comprises one of a variety of vegetable fibers in the natural state, preferably short-length cotton linters, to which an inexpensive filler material or materials such as wood chips, grain (rice) hulls and the like may be added, which are both chemically and mechanically processed so as to impart to the vegetable fibers certain beneficial and highly desirable properties over and above those possessed by such fibers in their untreated state, including without limitation the ability to withstand stratification and settling in use when compacted by the so-called ram-packing technique to the form of a semi-rigid cylindrical filter cartridge.

However, because of the physical nature of this new filtering media and the desirability of producing filter elements or cartridges therefrom by ram-packing said filtering media into various type enclosures therefor in such a way that the vegetable fibers constituting the principal component of the media are not permitted to stratify or migrate, the enclosing structure of the filter element or cartridge must be so constructed and arranged as not only to enable the filter media being packed therein by modern, high-speed filter-element packing equipment, but also to accomplish positive separation of the inlet and outlet portions or sides of the final filter elements.

Whereas our aforesaid companion application relates to oil filters using the improved filtering media according to the Baldwin application which are especially designed for filter applications requiring rigid-type filter elements, it is a major object of the present invention to provide an improved flexible-container or so-called sock-type filter element or cartridge employing such filtering media in the form of short-length chemically treated vegetable fibers either alone or supplemented by a filler material such as wood chips, grain hulls and the like, for applications making the use of a flexible filter shell desirable or necessary.

More particularly, the invention contemplates an improved design of flexible-shell or sock-type filter element capable of being packed under high pressure with the new filtering media characterized as aforesaid using automatic or semi-automatic packing techniques, and whose construction is further such as to positively prevent migration of the fibers or particles from the outlet to the inlet sides of said structure.

Another object of the invention is the provision of a flexible shell or container type of filter cartridge characterized by simple yet highly effective design and which is inexpensive in construction and thoroughly dependable in use.

Other objects and features of advantage of an oil filter element or cartridge according to the present invention will appear from the following detailed description taken with the drawing illustrating same, in which:

FIG. 1 is a broken-away, part-sectional, side elevational view of one form of flexible-container or sock-type filter element as herein contemplated;

FIG. 2 is a one-half top view of the filter element shown in FIG. 1;

FIG. 3 is an enlarged fragmentary section illustrating the manner of securing an end of the knit cotton tubing making up the flexible container or shell to the center tube assembly, and a preferred form of end seal employed; and FIG. 3A is a similar fragmentary but separated view illustrating the relationship of parts prior to end-structure assembly and final securement.

Referring to the drawings in greater detail, such illustrates that a flexible container (also known as the sock-type) form of filter element according to the invention comprises a center tube assembly made of a perforated steel center tube 10 exteriorly wrapped with an inner wrap 11 of muslin or non-woven cotton material and an outer wrap 12 preferably of knit cotton tubing; an outer shell or container 14 of knit cotton tubing shaped to have integral end walls 14a, 14b and having its terminal end portions 14c turned inwardly to extend well into the corresponding ends of the center tube 10 and held in place therein by tubular or band-form end plugs of fiber, steel or wood, of which the upper one designated 16 is shown, it being noted that two plies 17, 18 of relatively soft tube-end protecting material, which may be provided by the ends of the center-tube wrappings 11 and 12 which are extended over the end edges of the tube and tucked inwardly into the open ends thereof, are preferably interposed between each of said secured end portions of the knit-tubing shell 14 and the metallic end surfaces of the center tube; and end-seal and retainer assemblies 20–23 (of which the upper one is shown) driven into the ends of the center tube 10 in manner as to cause said ends to curl outwardly into the retainer assemblies, as is best shown in FIG. 3, thus effectively to secure the ends of the knit tubing forming the shell 14 to the ends of the steel center tube, each said assembly comprising an initially cup-shaped steel retainer member 20 provided with a center opening in its bottom of diameter corresponding substantially to that of the end plugs 16, an annular sealing gasket or end seal 21 of suitable flexible material such as neoprene seated on the outwardly facing bottom wall of the retainer member, and a steel end seal-retaining washer 22 disposed outwardly of said end seal and being held tight thereagainst by inward projections 23 punched or otherwise formed in the cylindrical wall of the cup-shaped retainer member 20 at spaced points along its circumference, generally as shown in FIGS. 2 and 3. Preferably, the parts making up each of the end-seal and retainer assemblies are pre-assembled to one another in a swedging operation which shapes the intermediate-length and open-end edge portions of its initially cylindrical cup-shaped body into outwardly flaring and thence curled-over flanges, respectively, which together extend from the cylindrical bottom portion of the retainer-member side wall outwardly and downwardly throughout an arc of approximately 270°. However, it will be obvious that the aforesaid flaring and edge-curling operation may be performed prior to assembling the end seal 21 and washer 22 to the cup-shaped retainer member 20.

It will of course be understood that the annular space between the center tube 10 and the knit-tubing shell is filled with the aforementioned improved filtering media designated 25 which is packed therein under great pressure as results in the filtering media being compacted to the form of a semi-rigid cake within the flexible container shell 14.

To assemble a filter element as just described, the center tube assembly 10–12 is first prepared and by reference to FIG. 3A will at this stage have straight cylindrical formation. Then an end 14c of the outer shell-forming knit tubing 14 is inserted into one end of the center tube, after first having inserted the layers 17, 18 of tube protective material in place in said center tube, and the tube plug 16 for that end of the center tube is thereupon forced thereinto to secure the end of the knit tubing in place. Next, the center tube 10 with one end of the knit tubing secured as aforesaid is placed in the filtering-media packing equipment, in which the knit tubing is preliminarily formed to container configuration and also held open at one end, and the filtering media is "ram-packed" therein under great pressure as aforesaid. Upon withdrawal of the assembly at this stage of its fabrication from the packing machine, the other loose end of the knit tubing or 'sock" is next brought inwardly over and into and then assembled to the other end of the steel center tube 10, using the tube plug 16 therefor as aforesaid. Finally, the previously preassembled end seal and retaining assemblies 20–23 are driven into the ends of the center tube, causing said ends to flare outwardly and thence curl outwardly and downwardly to the approximate configuration shown in FIG. 3, thus in the final structure to effect a positive closure of the ends of the knit tubing shell and also precluding any possibility of the fibers or filler material making up the filtering media migrating from the interior of the container or shell proper over the ends of the center tube and thence into the lubricating system.

Without further analysis, it will be seen that a flexible, i.e., sock-type container filter element as described in the foregoing, achieves the above-stated objectives of the invention. More particularly, there is provided a filter element employing the aforesaid filtering media which is particularly adapted to those applications wherein a flexible—rather than a rigid container—or shell-type filter element is appropriate as determined by the environment of mounting, nature of the filtering operation desired, etc. Furthermore, the construction is such that migration of the short-length vegetable fibers making up the body of the filtering element from the inlet side to the outlet side of the filter element is positively prevented, and at the same time it lends itself to simple production, including packing of the filter containers with the chemically treated, short-length vegetable fibers constituting the filtering media or the principal ingredient thereof in modern ram-packing machines.

As many changes could be made in carrying out the above constructions without departing from the scope of the invention, it is intended that all matter contained in the above description or shown in the accompanying drawing shall be interpreted as illustrative and not in a limiting sense.

We claim:
1. An oil filter element of the flexible container type comprising a perforated metallic center tube, a tubular knitted container member disposed about the center tube and having end portions which extend a substantial distance inwardly into the opposite ends of the center tube thereby forming therewith a closed-ended annular container, a densely compacted mass of vegetable fibers in said container, band-form plugs contained within the center tube and securing the end portions of said knitted container member thereto at locations disposed axially inward from the ends of said tube, and combined end seal and retainer assemblies drive-fitted into the outer ends of the center tube to the depth of said plugs thereby clamping the container end portions to the ends of the center tube, each said assembly and the end of the center tube into which it is fitted having coextensive interlocking flange portions which flare radially outwardly and thence curl axially-inwardly, the flaring and curling of said tube end occurring as an incident to said assembly being drive-fitted into the tube as aforesaid, whereby mounting of said assemblies effects positive securement and sealing of the end portions of the knitted container member to the ends of the metallic center tube.

2. An oil filter according to claim 1, wherein said end seal and retainer assemblies each comprises a retainer member of hard metal having a cylindrical bottom portion of external diameter corresponding substantially to the internal diameter of the center tube and an outwardly flared intermediate-length portion terminating in a relatively outwardly-inwardly curled edge portion and said portions define the aforesaid interlocking flange portion of the assembly.

3. An oil filter according to claim 2, wherein said cylindrical bottom portion has an annular bottom wall defining an opening of diameter corresponding substantially to that of said band-form plugs, a sealing gasket is seatably mounted on said annular wall, and said cylindrical bottom portion fixedly mounts a gasket-retaining washer disposed on the relatively outer side of said gasket.

4. An oil filter according to claim 1, wherein said center tube is provided with at least one external wrapping which is extended over the end edges of said tube and into the interior thereof so as to underlie the end portions of the flexible container which extend into said center tube, whereby said end plugs and end seal and retainer assemblies also secure the ends of said wrapping in place on the tube.

References Cited in the file of this patent
UNITED STATES PATENTS

| | | |
|---|---|---|
| 2,301,121 | Kamrath | Nov. 3, 1942 |
| 2,334,664 | Wicks | Nov. 16, 1943 |
| 2,345,849 | Winslow et al. | Apr. 4, 1944 |
| 2,398,284 | Briggs | Apr. 9, 1946 |
| 2,543,481 | Wicks | Feb. 27, 1951 |
| 2,584,771 | Wilkinson | Feb. 5, 1952 |
| 2,597,770 | Alexander | May 20, 1952 |
| 2,613,814 | Moore | Oct. 14, 1952 |
| 2,781,619 | Gardes | Feb. 19, 1957 |
| 2,994,435 | Moore | Aug. 1, 1961 |